3,367,999
METHOD OF MAKING POLYETHYLENE SURFACE HYDROPHILIC AND INK RECEPTIVE BY ADDING OXIDIZED POLYETHYLENE
Bernard L. Steierman, Toledo, Ohio, assignor to Owens-Illinois, Inc., a corporation of Ohio
No Drawing. Continuation of application Ser. No. 793,255, Feb. 16, 1959, which is a continuation-in-part of application Ser. No. 550,753, Dec. 2, 1955. This application Oct. 22, 1965, Ser. No. 502,515
10 Claims. (Cl. 260—897)

This invention relates to a process for forming polyethylene articles having hydrophilic surfaces which are receptive to printing inks, dyes, cements, adhesives and a wide variety of like materials, which materials will tenaciously bond to the surface of the article, and to the product made in accordance with the process. This application is a continuation of application Ser. No. 793,255 filed Feb. 16, 1959, now abandoned, which in turn is a continuation-in-part of application Ser. No. 550,753, filed Dec. 2, 1955, now abandoned.

Polyethylene is extensively used in the packaging field in the form of films, sheets, tubes and containers for retaining a multitude of products. The polyethylene consists of a solid polymer of ethylene which, in its fabricated form, has the distinctive properties of semi-transparency, thermo-sealing, outstanding resistance to many chemicals and good resistance to moisture vapor penetration.

Polyethylene, and articles made thereof, such as sheets, films, bottles, containers, etc., has an extremely smooth hydrophobic surface which is unreceptive to most common types of printing inks and dyes, such as the oil, lacquer, or aniline-based materials which are widely used as decorating materials to print indicia, legends or advertising messages on ordinary containers. When these same materials are used to decorate or print the surface of polyethylene containers, only temporary adherence is obtained and the decorative coatings are easily removed by the normal handling of the containers, frequently while the containers are being packaged or handled prior to distribution. Also, many common solvents for the decorating materials are unable to penetrate the polyethylene surface, even slightly, so that no chemical or physical anchorage of the decorating materials is produced thereon.

To minimize or obviate the difficulty existing in connection with the adherence of printing inks thereon, it is known that the surface of polyethylene films, containers, and other articles may be treated with oxidizing agents such as acidic solutions, ozone, and the like, prior to applying the printing inks thereon. It has also been noted that if a polyethylene surface is treated with a flame, it becomes receptive to printing inks. Another approach to the problem has been to print the polyethylene with especially compounded inks or dyes employing special printing techniques. Because of modifications required beyond conventional printing methods, surface treatment has been preferred to improve the adhesion of standard inks, rather than using special inks and techniques therefor.

A test which has been adopted and is presently used for determining the adherence of printing inks to polyethylene surfaces is known as the "Scotch tape" test. The polyethylene surface, after being printed, is covered with a strip of pressure-sensitive adhesive tape, "Scotch tape," and the amount of ink adhering to the adhesive of the tape and removed from the polyethylene surface is noted. When the polyethylene surface is untreated, and thus hydrophobic, substantially all of the ink is removed by the tape. This test provides a measure of the effectiveness of a surface treatment and/or a special ink preparation with respect to the adherence of a printing ink on the surface of the polyethylene article. Thus, the less ink removed by the tape, the more effective the treatment.

It is an object of this invention to obviate the above disadvantages presently found in articles formed of polyethylene.

It is a further object of this invention to provide a process for making a shaped polyethylene article, whose surface is inherently hydrophilic and receptive to printing inks and which needs no further treatment prior to printing thereon.

In attaining the objects of this invention, one feature resides in thoroughly blending together a mixture of commercially available, high molecular weight polyethylene with a minor but effective amount of an oxidized, low molecular weight, polyethylene wax to form a plastic molding composition and shaping the composition into an article by any of the known commercial methods, which article has a surface which is hydrophilic and receptive to printing inks.

Further objects and advantages of this invention will become apparent to one skilled in the art from the following detailed description.

The plastic molding composition consists principally of a major amount of commercially available polyethylene which is normally unreactive, chemically saturated, and hydrophobic with a lesser but sufficient amount of a modified oxidized polyethylene wax to render any article shaped therefrom hydrophilic and receptive to printing inks and other decorative materials and the like. The generally unreactive polyethylene is a fully polymerized product of ethylene which is frequently, but not necessarily, formed at elevated temperatures and pressures. This polyethylene has a high molecular weight, which may vary from approximately 17,000 to 70,000 and even higher, and has outstanding chemical and physical properties. It is exceptionally resistant to chemical attack at normal temperatures and is physically tough, very flexible and highly desirable for many special applications, such as blowing, molding, extruding and other known processes for shaping polyethylene.

The modified polyethylene wax is usually formed at lesser temperatures and pressures and is neither as solid nor as outstanding in its properties as the high molecular weight polyethylene. Its consistency being more waxy, it is frequently applied to coating paper products and blending into waxy materials. Its molecular weight usually ranges from approximately 100 to 1,500 and can go even as high as about 15,000. It is incapable of being blown or molded as is the aforementioned high molecular weight polyethylene. The wax is considerably less expensive and applicable to fewer uses. The polyethylene wax is modified to have a partially or fully oxidized structure which is considerably more reactive than the high molecular weight polyethylene. The polyethylene wax may be oxidized by any one of numerous oxidizing methods to form carbon-oxygen linkages or suitably reacted to form carboxyl groups. The wax has smaller molecules to which the oxygent atoms are able to bond. These linkages are more easily broken by reaction with the constituents of inks and dyes than the long chain linkages of carbon saturated with hydrogen atoms.

It has been found that when oxidized polyethylene wax is blended into the high molecular weight polyethylene in minor, but sufficient amounts to impart thereto a desirable property of wax, i.e., greater reactivity, the resulting article shaped therefrom has its surface hydrophilic and receptive to printing inks.

This desirable property is obtained when approximately 2 to 20% by weight of the oxidized wax or other modified polyethylene is blended into the higher molecular weight polyethylene of moldable or blowable grade. The amount of modified polyethylene wax which is so incorporated may vary depending upon the amount of surface reactivity desired in a particular product or article. Good results are produced when 5 to 10% by weight additions of wax are thoroughly mixed into and blended with the higher molecular weight polyethylene prior to its fabrication into final form. Both polyethylene materials are very compatible resulting in a relatively uniform dispersion of reactive groups of the modified wax throughout the higher molecular weight polyethylene. Thus, any articles shaped from this composition have all of their surfaces hydrophilic and ink receptive, ab initio.

A preferable composition consists of approximately 90% by weight of high molecular weight polyethylene and 10% by weight of relatively low molecular weight oxidized polyethylene wax. The composition is able to be blown or molded similarly to the high grade molecular weight polyethylene alone with no appreciable degradation of its properties. Articles fabricated from this composition have shown the same remarkable toughness, flexibility and resistance to chemical attack at normal temperatures. When an article such as a film or container is formed, the reactive groups of the wax are uniformly dispersed over the entire surfaces thereof and these surfaces are readily available for chemical combination with consituents of properly formulated inks or dyes. The inks or dyes may consist of any of the common organic types which are able to form a firm, adherent chemical bond with the reactive polyethylene surface. Thus, the printability of the surface is increased.

The following examples are merely illustrative of this invention and are to be in no way considered as limiting the scope of the invention.

*Example I*

98 parts by weight of polyethylene having an average molecular weight of 25,000 was thoroughly blended with 2 parts by weight of an oxidized polyethylene wax having an average molecular weight of 1,500 and the resulting mixture was rolled for three minutes on a differential roll mill at 260° F. to form a plastic composition.

*Example II*

95 parts by weight of polyethylene having an average molecular weight of 25,000 was thoroughly blended with 5 parts by weight of an oxidized polyethylene wax having an average molecular weight of 1,500 and the resulting mixture was rolled for three minutes on a differential roll mill at 260° F. to form a plastic composition.

*Example III*

A third plastic molding composition containing 90 parts by weight of polyethylene and 10 parts by weight of oxidized polyethylene was was prepared in the same manner as in Example I, using the same ingredients.

A group of bottles were molded from each of the above-described compositions at a temperature of 300° F. Another group of bottles were formed from the high molecular weight polyethylene alone, milled in the same manner, and still another group of bottles were formed from the unmilled high molecular weight polyethylene, per se.

All of the bottles were printed by the silk screen process using an ink normally used on polyethylene surfaces, namely Sherwin Williams Screen Process Color, No. 102— Fire Red, D22R9. The bottles were then baked for 20 minutes at a temperature of 180° F. and a strip of pressure-sensitive adhesive tape (Scotch tape) was applied to each of the printed surfaces. The tape was then removed and the amount of ink adhering to the tape and removed from the surface was noted.

The bottles made from the polyethylene alone, both milled and unmilled, had the ink substantially completely removed therefrom by the adhesive tape since the surfaces of the bottles were hydrophobic and not receptive to printing inks. The bottles containing 2% of oxidized polyethylene wax had only approximately 1/10 of the ink removed therfrom. The bottles containing 5% of oxidized polyethylene wax had an even smaller amount of ink removed, namely aproximately 1/20 while the bottles with 10% of oxidized polyethylene wax added thereto hardly had any of the ink removed from their surfaces.

Thus, while considerable improvement in the adherency of the printing ink to the polyethylene surface is achieved when from 2 to 20% of a low molecular oxidized polyethylene is blended with commercially available polyethylene normally used in the making of bottles, it was noted by the "Scotch tape" test that a composition of approximately 90% polyethylene and 10% of oxidized polyethylene wax retains a printing ink nearly as well as a container of high molecular weight polyethylene whose surface had been flame treated prior to printing thereon. The adhesion of the ink appears to be proportional to the amount of oxidized polyethylene wax added. Lesser additions are not as effective as increased amounts with a 5% wax addition being approximately twice as good as a 2% addition. Similarly, a 10% addition is approximately twice as good as a 5% addition.

The reactivity of the polyethylene composition which is due to the presence of the oxidized polyethylene, is present on all surfaces, beneath the surfaces, and throughout the articles. The polyethylene article may be remolded or reworked without destroying the reactive property of its surfaces and the new surfaces which are exposed are still hydrophilic and ink receptive. The surface of the polyethylene is also more electrically neutral being receptive to both polar and non-polar compounds alike. The surface is receptive to glues, adhesives, cements, as well as printing inks and dyes, and provides a highly reactive and easily decorated hydrophilic surface. The present composition is particularly useful in the form of extruded films for food packaging and as flexible squeeze-type bottles. The wax, being the more inexpensive product, permits a reduction in cost of resilient polyethylene articles.

The high molecular weight polyethylene, available commercially in pellet or flake form, may be plasticized with the low molecular weight oxidized polyethylene, and the plasticized composition resulting is then added to an extrusion or molding machine to make the desired article. Another method is to add the pellets separately into the machine and prior to extrusion a metered flow of the low molecular weight oxidized polyethylene may be introduced therein and thoroughly blended and plasticized at an elevated temperature to form the plastic molding or extruding composition for the shaped article, such as bottles, sheets, films, containers and the like. The completed article is homogenous, i.e., it is the same throughout and no matter how it may be reworked or reshaped to expose additional surfaces, it will always have the property of being hydrophilic and receptive to printing ink and other decorative materials on its surface.

Other modifications may be resorted to within the spirit and scope of the appended claims without deviating from the invention set forth.

Having fully described the invention, what is claimed is:

1. The method of making a printed polyethylene article whose surface is hydrophilic and receptive to printing inks, without the necessity of subjecting said surface to any printability treatment, consisting essentially of the steps of plasticizing a major proportion of a high molecular weight polyethylene with a minor proportion of a low molecular weight oxidized polyethylene, shaping the plasticized mixture to form the article, and, without subjecting the surface of said article to any intervening printability treatment, applying a printing ink directly to said surface of said article to form an image thereon, said ink firmly adhering to said surface.

2. The method as defined in claim 1 wherein said oxidized polyethylene is present in an amount of from 2% to 20% by weight of the plasticized mixture.

3. The method as defined in claim 1 wherein said high molecular weight polyethylene has a molecular weight of from 17,000 to 70,000 and said oxidized polyethylene is present in an amount of from 2% to 20% by weight of the plasticized mixture.

4. The method as defined in claim 2 wherein said oxidized polyethylene has a molecular weight of from about 100 to 15,000.

5. The method as defined in claim 4 wherein said oxidized polyethylene has a molecular weight of from about 100 to 1500.

6. The method as defined in claim 3 wherein said oxidized polyethylene has a molecular weight of about 100 to 15,000.

7. The method as defined in claim 6 wherein said oxidized polyethylene has a molecular weight of about 100 to 1500.

8. The method of making a printed polyethylene article whose surface is hydrophilic and receptive to printing inks, without the necessity of a printability treatment, consisting essentially of the steps of plasticizing a high molecular weight polyethylene having a molecular weight of from about 17,000 to 70,000 by intimately mixing the high molecular weight polyethylene with an oxidized polyethylene wax having a molecular weight of from about 100 to 1500, said wax being present in an amount of from 2% to 20% of the plasticized mixture, shaping the plasticized mixture to form the article, and, without subjecting the surface of said article to any intervening printability treatment, printing directly on the surface of said article.

9. The method as defined in claim 8 wherein the plasticized mixture is extruded to form a polyethylene bottle whose surface is hydrophilic and receptive to printing inks.

10. The method of making a printed polyethylene bottle whose surface is hydrophilic and receptive to printing inks consisting essentially of the steps of plasticizing polyethylene having a molecular weight of from about 17,000 to 70,000 with an oxidized polyethylene wax having a molecular weight of from about 100 to 15,000, said wax being present in an amount of from 2 to 20% of the plasticized mixture, extruding said plasticized mixture to form the bottle, and, without subjecting the surface of said bottle to any intervening printability treatment, printing directly on the surface of said bottle.

References Cited

UNITED STATES PATENTS

| | | | |
|---|---|---|---|
| 3,256,365 | 6/1966 | Wolinski | 260—897 |
| 2,504,270 | 4/1950 | Mac Laren et al. | 260—28.5 |
| 2,554,259 | 5/1951 | Mikeska et al. | 260—897 |
| 2,874,137 | 2/1959 | Pisanchyn et al. | 260—897 |

FOREIGN PATENTS

| | | |
|---|---|---|
| 832,174 | 6/1938 | France. |
| 581,279 | 10/1946 | Great Britain. |
| 697,326 | 9/1953 | Great Britain. |

G. F. LESMES, *Primary examiner.*

MURRAY TILLMAN, SAMUEL H. BLECH,
*Examiners.*

E. B. WOODRUFF, T. G. FIELD, *Assistant Examiners.*